(12) United States Patent
Keen

(10) Patent No.: US 7,909,125 B1
(45) Date of Patent: Mar. 22, 2011

(54) DUAL PIVOTING HOOD SUPPORT

(75) Inventor: Eric Albert Keen, Waterloo, IA (US)

(73) Assignee: Deere & Company, Moline, IL (US)

( * ) Notice: Subject to any disclaimer, the term of this patent is extended or adjusted under 35 U.S.C. 154(b) by 2255 days.

(21) Appl. No.: 09/905,726

(22) Filed: Jul. 13, 2001

(51) Int. Cl.
*B62D 25/10* (2006.01)

(52) U.S. Cl. .......................... 180/69.21; 16/230; 16/231

(58) Field of Classification Search .................... 16/230, 16/231; 180/69.2, 69.21, 89.12, 89.13, 89.17; 292/DIG. 14
See application file for complete search history.

(56) References Cited

U.S. PATENT DOCUMENTS

| | | | | |
|---|---|---|---|---|
| 2,785,921 A | * | 3/1957 | Barnenyl | 16/230 |
| 2,817,870 A | * | 12/1957 | Howell | 16/230 |
| 3,008,177 A | * | 11/1961 | Wooten, Jr. | 16/230 |
| 3,815,176 A | * | 6/1974 | Porter | 180/69.21 |
| 4,134,179 A | * | 1/1979 | Silaghi | 180/69.21 |
| 4,382,312 A | * | 5/1983 | Liggett et al. | 180/69.21 |
| 4,479,675 A | * | 10/1984 | Zankl | 16/230 |
| 4,853,985 A | * | 8/1989 | Perry | 180/69.21 |
| 5,339,494 A | | 8/1994 | Esau et al. | 16/294 |
| 5,535,846 A | | 7/1996 | Kurtz, Jr. et al. | 180/69.21 |
| 5,564,514 A | | 10/1996 | Knight | 180/69.21 |
| 5,645,133 A | | 7/1997 | Thompson et al. | 180/69.21 |
| 5,651,164 A | * | 7/1997 | DeMarco | 16/230 |
| 5,803,198 A | | 9/1998 | Baxter et al. | 180/69.21 |
| 6,213,235 B1 | * | 4/2001 | Elhardt et al. | 180/69.2 |
| 6,330,734 B1 | * | 12/2001 | Cho | 180/69.21 |

* cited by examiner

*Primary Examiner* — Michael Mar

(57) ABSTRACT

A dual pivoting hood support mechanism includes a first support mounted on the vehicle near a rear end of the hood, a second support mounted on the vehicle forward of the first support, a first arm coupled to the rear end of the hood, and a second arm pivotally coupled to a central portion of the hood. The first arm is releasably and pivotally coupled to the first support, and the second arm is releasably and pivotally coupled to the second support. The hood can be pivoted rearwardly about the first support to a fully raised position by uncoupling the second arm from the second support. The hood can also be placed in a service position wherein the rear end of the hood is higher than the front end of the hood and when the first arm is uncoupled from the first support.

4 Claims, 4 Drawing Sheets

DUAL PIVOTING HOOD SUPPORT

FIELD OF THE INVENTION

This invention relates to a support mechanism for a hood which covers a vehicle engine and other components of a vehicle, such as an agricultural or industrial vehicle.

BACKGROUND OF THE INVENTION

Tilt hoods on agricultural tractors typically tilt in only one direction relative to the chassis of the tractor. However, components along the entire length of the hood need periodic inspection and/or service, thus requiring such a typical hood to be completely removed so as to service components at the hinged end of the hood.

SUMMARY OF THE INVENTION

An object of the present invention is to provide a hood support mechanism which allows a hood to be tilted in multiple directions.

Another object of the present invention is to provide a hood support mechanism which allows a hood to be moved to various positions permitting access to all components under the hood without complete removal of the hood.

These and other objects are achieved by this invention wherein a support mechanism allows a hood to be tilted in multiple directions. The support mechanism includes a first support mounted on the vehicle near a rear end of the hood, a second support mounted on the vehicle forward of the first support, a first arm coupled to the rear end of the hood, and a second arm pivotally coupled to a central portion of the hood. The first arm is releasably and pivotally coupled to the first support, and the second arm is releasably and pivotally coupled to the second support. A bracket is fixed to the central portion of the hood, with the second arm having a first end pivotally coupled to the bracket and having a second end releasably and pivotally coupled to the second support. A variable length piston or gas spring member may be coupled between the bracket and a lower portion of the second arm. A spring link assembly is coupled between the bracket and the second arm.

The support mechanism permits the hood to be pivoted rearwardly about the first support to a fully raised position wherein a front end of the hood is positioned substantially vertically above the rear end of the hood when the first arm is pivotally coupled to the first support and the second arm is un-coupled from the second support. The hood can also be placed in a service position wherein the rear end of the hood is higher than the front end of the hood and wherein the first arm is un-coupled from the first support.

DESCRIPTION OF THE PREFERRED EMBODIMENT

Figure 1:
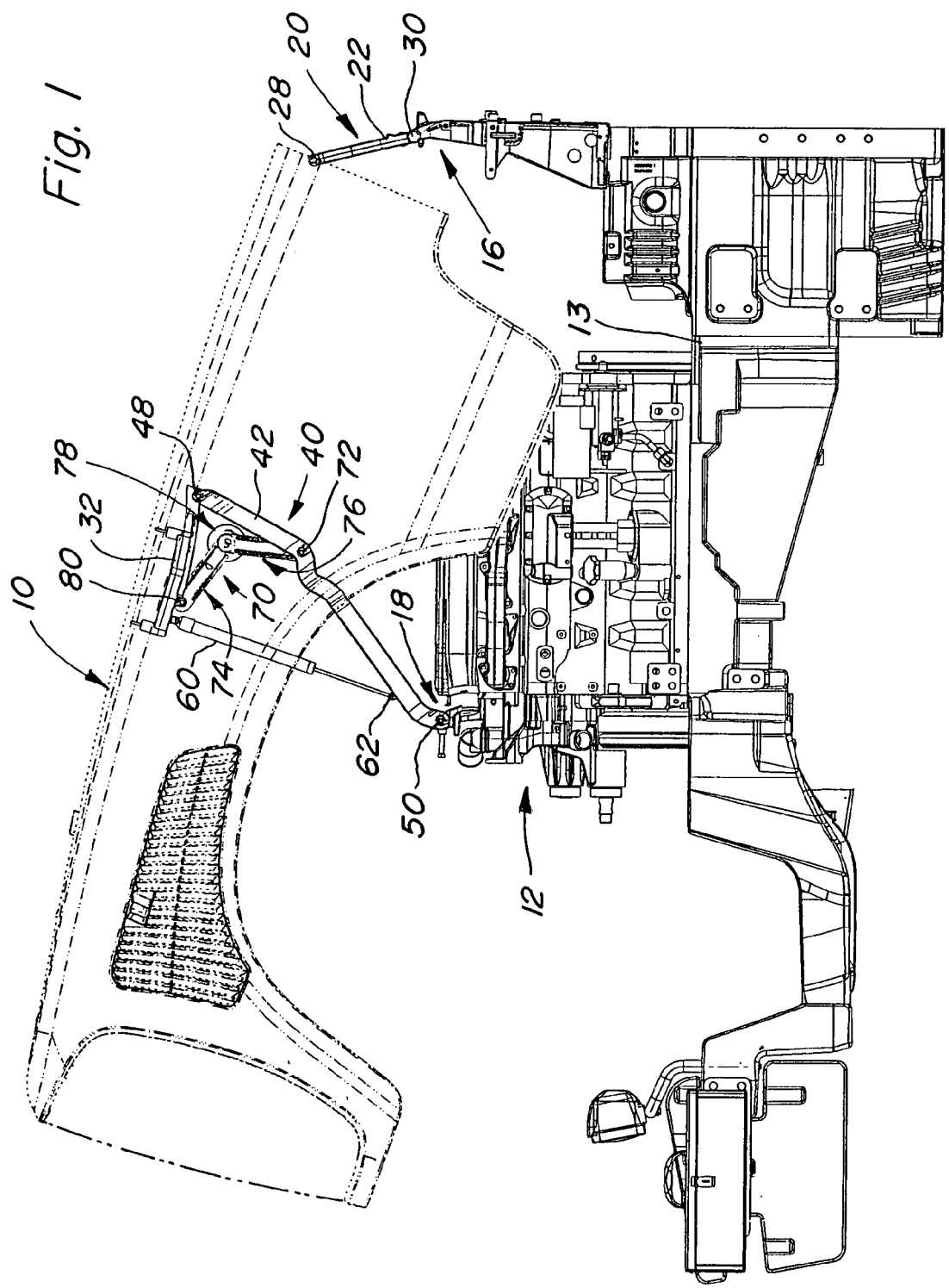
FIG. 1 is a side view of an agricultural tractor hood with a hood support mechanism according to the invention.
Figure 2:
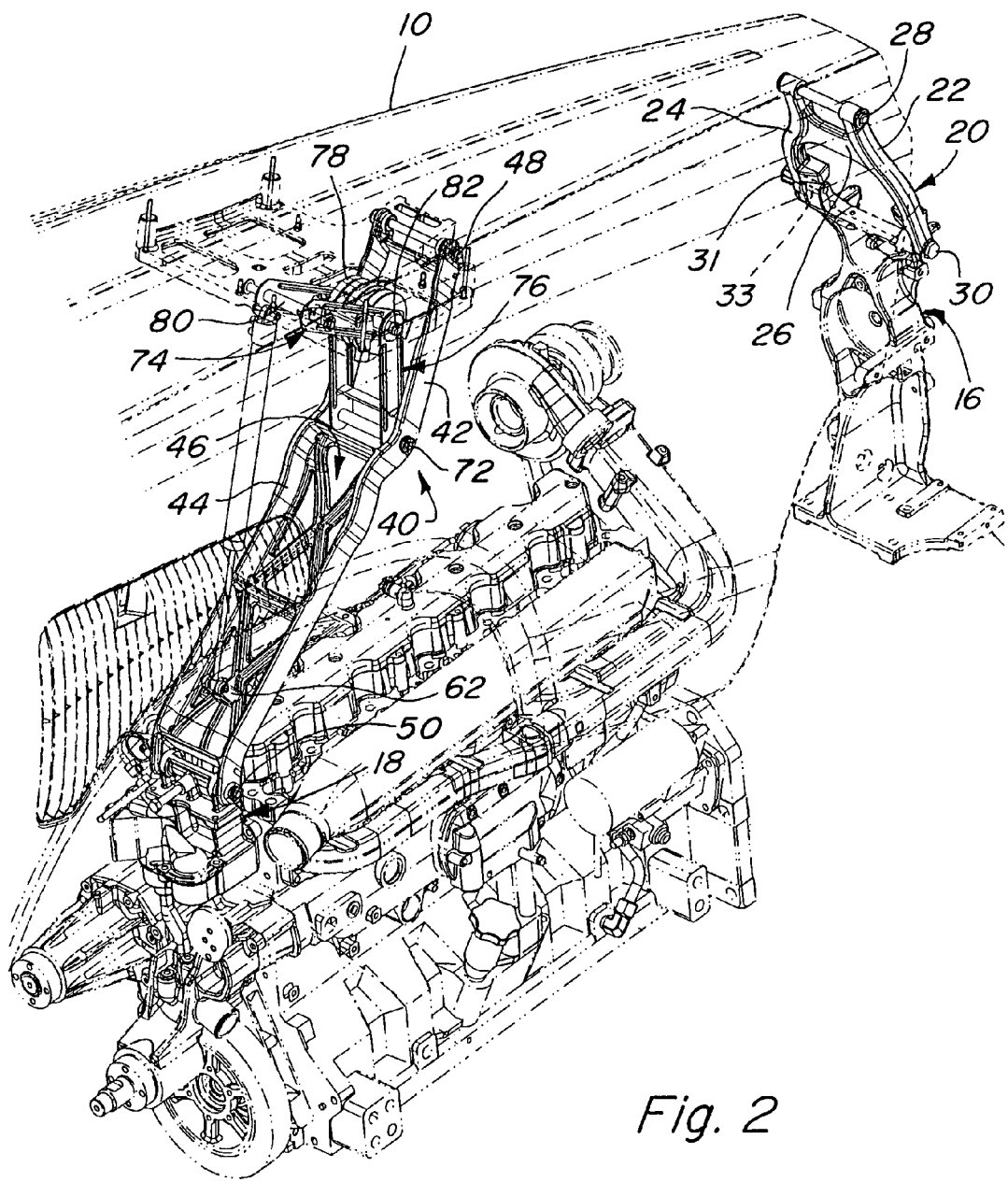
FIG. 2 is a perspective view of the hood support mechanism according to the invention.

As seen in FIGS. 1-4, a hood 10 is supported by a support mechanism 14 with respect to an engine 12 and frame 13 of an agricultural tractor (not shown). Support mechanism 14 includes a first support 16 mounted on the vehicle near a rear end of the hood 10. A second support 18 is mounted on the vehicle forward of the first support 16. A first arm unit 20 is pivotally coupled to the rear end of the hood 10, and is releasably and pivotally coupled to the first support 16. As best seen in FIG. 2, the first arm assembly or unit 20 includes a pair of arm members 22 and 24 joined by a cross member 26. Pivot pins 28 and 30 are received in bores formed in the respective upper and lower ends of the arm members 22 and 24. A locking pin or bolt 31 may be inserted through a lower part of arm member 24 and into a bore 33 in the right side of the upper portion of support 16. The locking pin 31 is preferably removed except when the hood 10 is to be held in a fully raised position described later with respect to FIG. 4.

A bracket 32 is fixed to the underside of a central portion of the hood 10. A second arm unit 40 is pivotally coupled to the bracket 32 and is releasably and pivotally coupled to the second support 18. As best seen in FIG. 2, the second arm unit 40 includes a pair of arm members 42 and 44 joined by a cross members 46. Pivot pins 48 and 50 are received in bores formed in the respective upper and lower ends of the arm members 42 and 44. A gas spring or damper 60 may be coupled between the bracket 32 and the arm unit 40. The gas spring 60 has an upper end pivotally coupled to a forward end of the bracket 32 and a lower end pivotally coupled to a bracket 62 which projects from the cross member 46 at a lower portion of the arm unit 40.

A spring link assembly 70 is coupled between the bracket 32 and a pivot pin 72 which is received by an upper portion of the second arm unit 40. The spring link assembly 70 includes a first pair of links 74, a second pair of links 76 and a coil spring 78. The first pair of links 74 have first ends pivotally coupled to a pivot pin 80 which is received by the bracket 32, and second ends pivotally coupled to the second pair of links 76. The second pair of links 76 have first ends pivotally coupled to the pivot pin 72, and have second ends pivotally coupled to the second ends of the first pair of links 74 via pivot pin 82. The coil spring 78 is mounted on pin 82 and is coupled between the first pair of links 74 and the second pair of link 76. The spring 78 is biased to move the second arm unit 40 in a direction which raises the front end of the hood 10.

As seen in FIG. 1, the hood 10 can be placed in a normal service position wherein the front end of the hood 10 is raised, while both the first arm unit 20 and the second arm units 40 both remain pivotally coupled to the respective supports 16 and 18.

Figure 3:
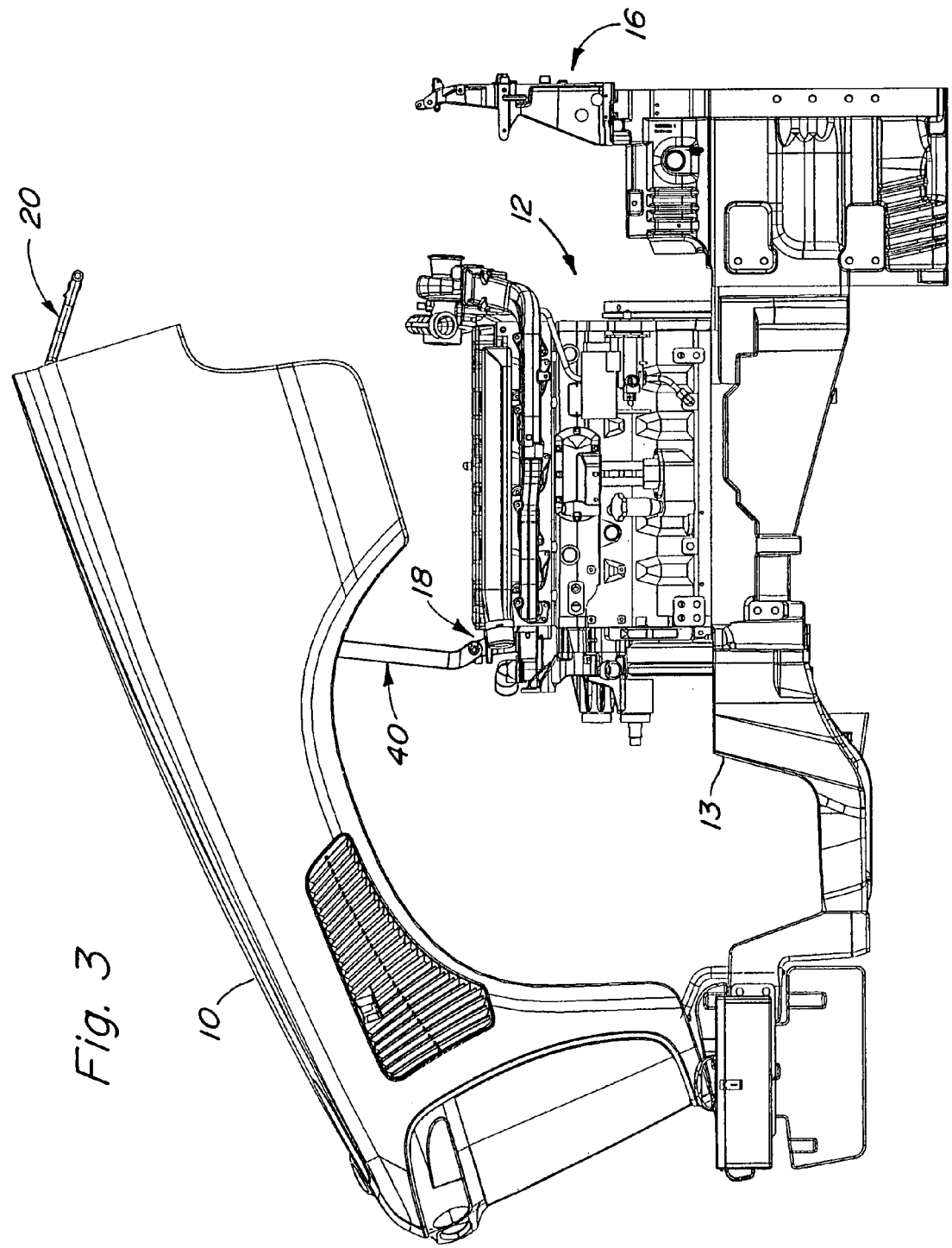
FIG. 3 is a side view of an agricultural tractor hood with a hood support mechanism according to the invention with the hood in a service position.

As seen in FIG. 3, the hood 10 can be placed in an additional service position wherein the rear end of the hood 10 is higher than the front end of the hood 10 and wherein the first arm unit 20 is uncoupled from the first support 16 by removing pin 30.

Figure 4:
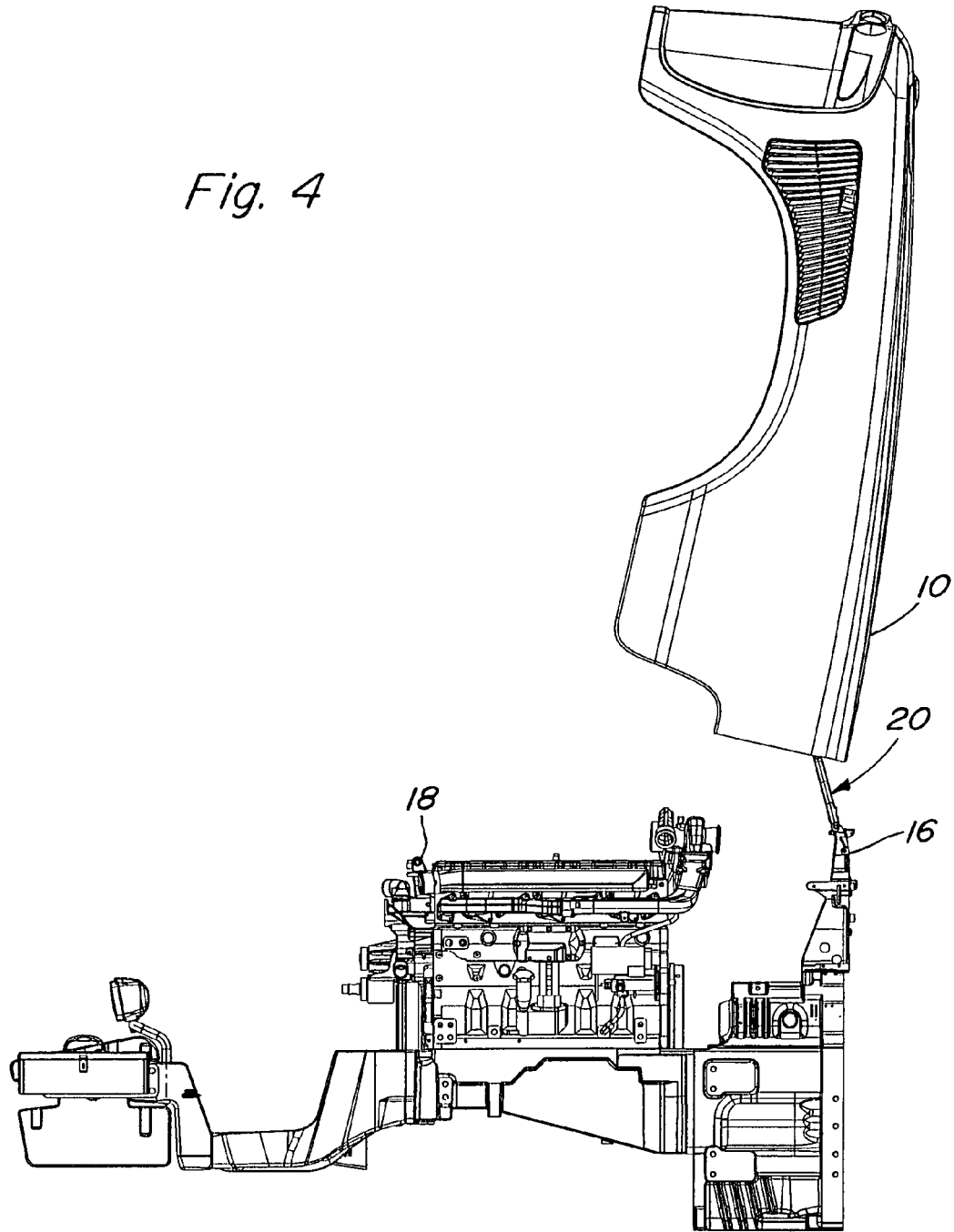
FIG. 4 is a side view of an agricultural tractor hood with a hood support mechanism according to the invention with the hood in a fully raised position.

As best seen in FIG. 4, the pin 50 can be removed to uncouple the second arm unit 40 from the second support 18. The support mechanism 14 then also permits the hood 10 to be pivoted rearwardly about the first support 16 to a fully raised position wherein a front end of the hood 10 is positioned substantially vertically above the rear end of the hood 10. In this position the locking bolt 31 is inserted into bore 33 to hold the arm unit 20 and hood 10 in the fully raised position. Although the front arm unit 40 is not shown in FIG.

4, the front arm unit 40 projects substantially horizontally away from the hood 10, when the hood 10 is in this fully raised position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

The invention claimed is:

1. A support mechanism for supporting a hood with respect to a vehicle to which the hood is pivotally coupled, the support mechanism comprising:
 a first support mounted on the vehicle;
 a second support mounted on the vehicle forward of the first support;
 a first arm coupled to a rear end of the hood, the first arm being releasably and pivotally coupled to the first support;
 a bracket fixed to a central portion of the hood;
 a second arm having a first end pivotally coupled to the bracket and having a second end releasably and pivotally coupled to the second support, the support mechanism permitting the hood to be pivoted rearwardly about the first support to a fully raised position wherein a front end of the hood is positioned substantially vertically above the rear end of the hood when the first arm is pivotally coupled to the first support and the second arm is uncoupled from the second support; and
 a spring link assembly coupled between the bracket and a central portion of the second arm, the spring link assembly being biased to move the second arm in a direction which raises the front end of the hood.

2. The support mechanism of claim 1, wherein:
 the hood can be placed in a service position wherein the rear end of the hood is higher than the front end of the hood and wherein the first arm is uncoupled from the first support.

3. The support mechanism of claim 1, further comprising:
 a variable length member having a first end pivotally coupled to the bracket and having a second end releasably and pivotally coupled to the second arm.

4. A support mechanism for supporting a hood with respect to a vehicle, the support mechanism comprising:
 a first support mounted on the vehicle rearwardly of an engine of the vehicle;
 a second support mounted on the vehicle forward of the first support;
 a first arm coupled to a rear end of the hood, the first arm being releasably and pivotally coupled to the first support;
 a bracket fixed to a central portion of the hood, and
 a second arm having a first end pivotally coupled to the bracket and having a second end releasably and pivotally coupled to the second support, the support mechanism permitting the hood to be pivoted rearwardly about the first support to a fully raised position wherein a front end of the hood is positioned substantially vertically above the rear end of the hood when the first arm is pivotally coupled to the first support and the second arm is uncoupled from the second support; and
 a spring link assembly coupled between the bracket and the second arm, the spring link assembly comprising a first link having a first end pivotally coupled to the bracket and having a second end, a second link having a first end pivotally coupled to the second arm and having a second end pivotally coupled to the second end of the first link, and a resilient member coupled between the first and second link and biased to move the second arm in a direction which raises the front end of the hood.

\* \* \* \* \*